United States Patent [19]

Bidner et al.

[11] Patent Number: 5,049,900
[45] Date of Patent: Sep. 17, 1991

[54] KNURLED ROLLER FILM TRANSPORT AND REALTED METHOD

[75] Inventors: Harvey Bidner, Plainview; Amnon Goldstein, Pelham, both of N.Y.

[73] Assignee: Bidco Inc., Hickville, N.Y.

[21] Appl. No.: 422,127

[22] Filed: Oct. 16, 1989

[51] Int. Cl.$^5$ ............................................... G01D 9/42
[52] U.S. Cl. ................................... 346/108; 346/136; 400/617
[58] Field of Search ....................... 346/108, 134, 136; 400/617, 636, 639

[56] References Cited

U.S. PATENT DOCUMENTS

| | | | |
|---|---|---|---|
| 4,307,408 | 12/1981 | Kiyohara et al. | 346/108 |
| 4,683,480 | 7/1987 | Sakamoto et al. | 346/134 |
| 4,827,284 | 5/1989 | Ogiwara | 346/136 |
| 4,878,067 | 10/1989 | Yagoto et al. | 346/136 |

*Primary Examiner*—Mark J. Reinhart
*Attorney, Agent, or Firm*—Ladas & Parry

[57] ABSTRACT

An apparatus is provided for scanning a photographic film or the like with a laser beam. The apparatus includes a roll source or cassette of film to be supplied and used and a take-up cassette to receive the exposed film in the form of a roll. Between the source of the film and the take-up cassette there is provided an arrangement consisting of one or two knurled segments or rollers which peripherally engage the film along the lateral edges thereof in order to transport the film past a laser beam generator and scanner adjacent which the knurled roller or rollers are positioned in order to draw the film at a closely controlled rate past a slot through which the laser beam exits in order to photographically process the film. Between the knurled roller or rollers and the take-up cassette are provided exit rollers which engage the film at a slightly faster speed than the speed at which the film is travelling. The exit rollers are arranged to engage the film with a force of about 2½–4 pounds. The take-up cassette is provided with a slip clutch in order to compensate for the buildup of film on the roll as the process progresses. The source cassette is provided with lips which engage the film and which serve as a light seal. These lips also provide a drag on the film to prevent the film's being freely spooled out without control.

27 Claims, 2 Drawing Sheets

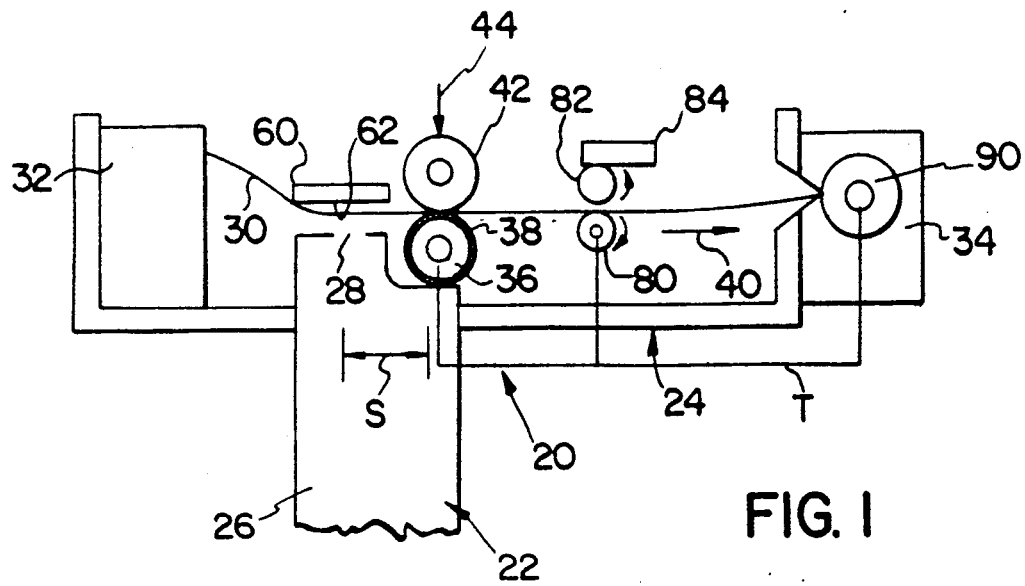
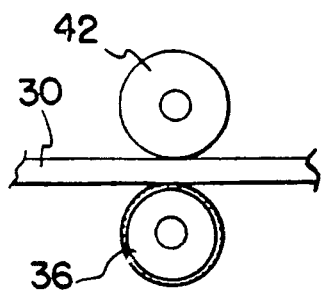
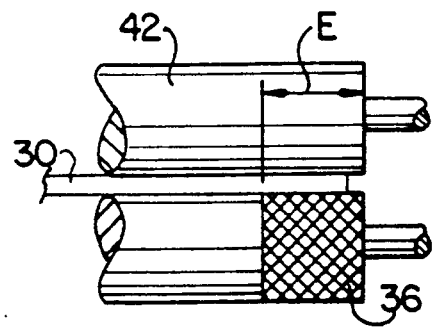
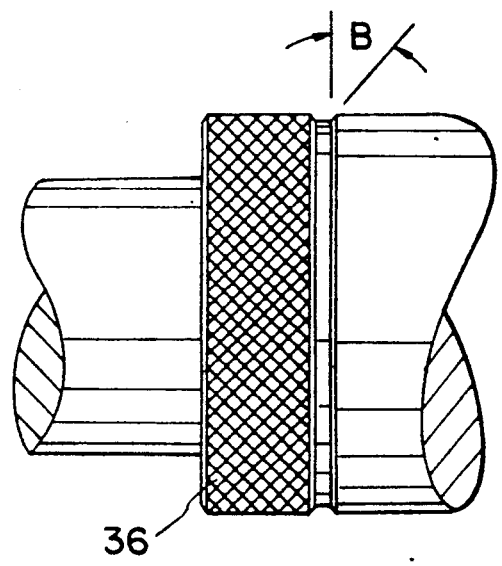

KNURLED ROLLER FILM TRANSPORT AND REALTED METHOD

FIELD OF THE INVENTION

This invention relates to laser imager arrangements and methods and more particularly to apparatus for the transportation of photographic film and the like including the supply, transportation and take-up of the same.

BACKGROUNDS OF INVENTION

In, for example, the scanning of photographic film or the like by laser beams to deposit pixels on the film, there is sometimes a very serious need for exceptional registration. This registration refers to the ability to establish on the photographic film pixel positions which are repeated with respect to a sequence of sheets which may subsequently be used cooperatively to form a composite image. Thus, for example, in the formation of a composite image with a plurality of colors these colors must be accurately placed on respective of a sequence of sheets in order that they can become properly combined to produce cooperatively a composite arrangement of colors. Such colors may also have to be aligned with a black and white arrangement which constitutes a text thus providing a further need for exceptional registration. Registration has to be effected between the pixel positions themselves which in turn may be registered relative to targets positioned on the respective sheets. These targets may take the form of cross lines arranged in the form of a plus sign or an X.

The achieving of registration has always been elusive and erratic in roll fed images. This has been due to the fact that using rollers to grab film requires high pressures and usually a large wrap around relative to the drive roller thus causing dimensional deformation of the photographic media or film (actually the medium can be film, photographic paper, or paper or plastic plate material). The reason that good registration is desired for roll fed images is that roll fed devices are inherently much faster than the other devices now used to obtain good registration. These other devices include sheet fed devices using drums or flat beds with various clamping means such as vacuums or pins, or quasi-sheet fed devices wherein sheets are pre-cut from a roll and then clamped by various means such as mentioned above.

Another reason for the desire to obtain good registration with roll (or web) fed devices is that good registration is required for the production of color separations in color printing. The use of known drum or flat bed devices to produce color separations is slow, therefore encouraging the use of roll fed images to produce black and white images and types on pages. This requires that the color picture and the type be then merged by cutting and pasting (a process known as stripping), and then photographing the merged page to create the separation plates for printing. This is labor intensive, consumes time, and consumes material (i.e., film) all of which is costly.

By using a roll fed imager capable of good registration, it is possible not only to produce type and color separations with the same imager, but also to produce them merged on the same page, thereby totally eliminating the stripping process. In addition, since roll fed devices are fast (that is why they are usually used to produce black and white and type), this registration capability makes it possible to produce color as well as black and white very quickly. This is particularly important in high production environments such as newspapers (which are steadily progressing to the use of color pages).

Photographic film and paper used for phototypesetting and other image recording applications as discussed herein include various typical commercial brands such as Kodak "Pagi Set" or Kodak Helium Neon Laser Film 2692, DuPont "Cronatype", or DuPont Helium-Neon CRT Film(CHC-4), Paper(CHE-P), Chemco "Powermatic", and Amitec "Reprotype".

SUMMARY OF THE INVENTION

It is an objective of the invention to provide an improved laser beam imager.

It is yet another object of the invention to provide an improved method of laser beam imaging.

Still another object of the invention is to provide improved apparatus for the improved transportation of photographic film or the like in association with laser beam imaging and other similar types of operations.

It is yet another object of the invention to provide improved methods relating to laser beam imaging processes and the like.

Yet another object of the invention is to provide for improve registration during laser beam imaging and the like.

It is still another object of the invention to provide for improved supply and take-up procedures relative to a laser beam imaging procedure having exceptional registration.

In achieving the above and other objectives of the invention there is contemplated in accordance therewith the provision of an apparatus which comprises a source of film, said film including a base and a laser sensitive material on the base with a film take-up means being provided for collecting the film preferably in the form of a roll. Further provided is a laser arrangement for scanning the film with a laser beam during movement of the film from the source to the take-up means. This movement may be continuous or intermittent and adjustment may be made in the supply of information by means of the laser beam to account for either continuous or intermittent movement of the film. The movement is controlled by at least one knurled roller or the equivalent thereof for engaging the film and drawing the same from the source. The roller is in accordance with the invention positioned to engage the film along at least one lateral edge of the same. Preferably the engagement is made by a pair of knurled rollers positioned to engage the film along the spaced lateral edges thereof. In further accordance with a feature of the invention an idler roller including a resilient surface is provided which sandwiches the film against the knurled roller. An arrangement is provided to positively drive the knurled roller to transport the film past the laser arrangement. In understanding the scope of the invention, it should be noted that reference is made herein to a photographic film. Other materials can similarly be transported in accordance with the invention such as photographic paper or paper or plastic plate material. It will thus be understood that when film is referred to in this text that the equivalent materials are also intended to be covered.

According to further features of the invention the knurled roller is prepared in order to provide a multiplicity of "pins". Thus, when reference is made to a knurled roller it is intended that equivalent structures also be included within this expression. The knurled roller of the invention will preferably have a knurl pitch in the order of magnitude of 40 per inch. This may include for example a magnitude of from 15 to 60 per inch. Under certain circumstances this magnitude may be greater or lesser than the indicated amount provided that an appropriate registration ensues from the structure which is employed. The knurl pitch mentioned above is defined by intersecting grooves forming angles arranged at for example a range of 30 to 60 degrees to the axis defined by the associated roller. The grooves will preferably form knurls of a diamond-shaped cross section.

According to a further feature of the invention opposed exit rollers on opposite sides of the film are arranged between the knurled roller or rollers and the take-up arrangement. A drive arrangement is provided to drive one of the exit rollers and a weight or the equivalent is provided to apply a force of about 2 ½ to 4 pounds against the other of the exit rollers to press the other of the exit rollers towards the first mentioned exit roller.

According to a further feature of the invention the laser arrangement may include a casing provided with a slot through which the laser beam exits to traverse and process the film photographically. This slot is preferably arranged at a distance of no more than about one to three inches from where the film is engaged by the knurled roller or rollers. According to yet another feature a pressure plate having a flat surface resting on the film over the aforementioned slot may be provided to flatten the film over the sam and to contribute to the exceptional registration.

In accordance with the invention the aforementioned source of film or the like may include a roller on which the film is wound, a casing within which the roller is mounted and which is provided with a slot for the exiting of the film, and pressure lips adjacent the slot to create a drag on the film exiting from the casing while providing furthermore for a light seal to prevent premature photographic modification of the film. The source may moreover include a roller to support the film preferably in the form of a roll although other forms of supply such as pleated webs may also be employed. In accordance with the invention a friction brake is also provided to prevent uncontrolled spooling off of the film from the aforementioned roll.

According to yet another feature of the invention a roller is also provided within the take-up means to collect the film in the form of a roll with a drive being provided to drive the further roll and a slip clutch arrangement being provided coupling the latter said drive to the roll in the take-up arrangement without stretching or breaking the film and to provide for compensating the accumulation of film on the roller at greater and greater radii.

According to yet another feature of the invention the driven exit roller is driven with a peripheral speed which is slightly faster than the available speed of the film and such that the driven exit roller slips on the film. It will be noted that the drive for the further roller in the take-up arrangement and for the driven exit roller may include a common gear train.

According to features of the invention relating to the knurle roller or rollers it will be noted that the roller will preferably have an outer diameter in the order of magnitude of about 1.440 inches and that the roller or rollers are knurled to cover an axial extent in the order of magnitude of about 0.500 inches. It will also be noted that the film is transported past the laser arrangement with the emulsion side down and that the knurled roller or rollers engage into the emulsion side of the film. It will also be noted that the slip clutch arrangement in the take-up cassette includes an approximately 5 oz. - inch slip clutch arrangement.

In the description of a detailed embodiment which follows hereinafter it will be noted that the film is divisible into sheets each of which is provided with at least one target. Preferably three targets are provided which are preferably in the form of a cross hair arrangement or an X. The film is preferably such as to have a mylar or polyester base and the film is preferably of a thickness in the order of magnitude of about 4 mils.

In accordance with still another feature of the invention the grooves which are employed to provide the knurled roller with a plurality of pins will have a substantially uniform depth of about 0.005 to 0.003 inches. Such grooves will define knurls preferably having a pyramidal shape with a diamond-shaped cross section. The knurled roller or rollers are preferably driven at a constant angular velocity which may preferably be derived from the common gear train mentioned hereinabove.

As has been noted hereinabove the invention also provides to be a method. This method may be considered a method of exposing a film to a transversely scanning laser beam to secure a plurality of exposures in close registration with one another (or with the targets mentioned hereinabove), the method comprising driving the film past the laser beam at a constant speed by engaging the film with at least one knurled roller or the equivalent thereof driven at a constant angular velocity. The film is preferably supplied from a supply roller although a pleated web or the equivalent may also be employed and taking the film up on a take-up roller. The knurled roller engages the film edgewise between the supply and take-up rollers o the equivalents thereof.

In accordance with further features of the method of the invention the film is preferably engaged with knurled rollers along opposite lateral edges of the film to an extent of about 0.100 to 0.350 inches at each of the aforementioned edges. The film is preferably forced against the knurled roller with a force that forces the knurls or pins into the film.

Other features of the invention comprise further driving the film between the knurled roller and the take-up roller by engaging the film with a driven roller the peripheral speed of which exceeds the speed of the film so that the driven roller slips on the film. The peripheral speed of the driven exit roller may exceed the speed of the film preferably by a magnitude of approximately 5-20%.

In yet another feature of the invention a drag is applied to the film supplied by the supply roller to prevent a free spooling off of the film. According to yet another feature the take-up roller is driven through a slip clutch to compensate for the building up of the film on the take-up roller.

Other features include urging the film against the driven exit roller with a force of about 2½-4 pounds and knurling the knurled roller with two groups of intersecting parallel lines forming diamond-shaped pyramidal pins.

The above and other objects, features and advantages of the invention will be found in the detailed description which follows as illustrated by the accompanying drawing.

BRIEF DESCRIPTION OF DRAWING

In the drawing:

FIG. 1 is a diagrammatic side view of a laser beam imaging or imager apparatus provided with a film transport in accordance with the invention;

FIG. 2 is a side view of a drive provided in accordance with the invention;

FIG. 3 is a front view of the roller arrangement illustrated in FIG. 2;

FIG. 4 is a view on enlarged scale of a knurled roller provided in accordance with the invention and employed in the apparatus of FIGS. 1-3;

DETAILED DESCRIPTION

Figure 5:
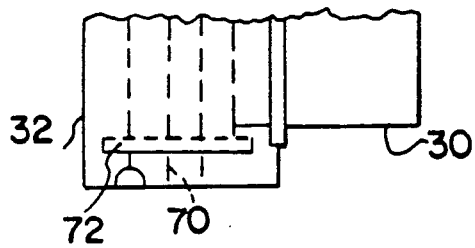
FIG. 5 is a diagrammatic front view of a supply cassette employed in the arrangement of FIG. 1.

The primary method of a present invention is the method of firmly holding and moving film. In this method a knurled segment of steel or the like on a drive roller grabs the film and holds it against a pressure roller or idler. The pressure roller is preferably coated with a hard rubber or a rubber-like material but a metal roller would also work. The knurl presses into the film and actually pins it against the pressure roller, producing what may be called "microsprockets" (many tiny points of very firm contact). The knurled segments are preferably located at both edges of the drive roller in order to hold firmly both edges of the film width, but experimental results have shown that, with the use of narrow film which can only be grabbed by one knurled segment or roller, the results are also good. When two knurls or knurl segments or rollers are used, the rollers must be made precisely so that they are round and have the same diameter.

There are two supplemental features that are required in order for this invention to give optimum results.

1). Supply Roll Drag

There must be sufficient drag in the associated supply cassette to prevent the film roll from spooling out. The percent change in drag must be minimized between an almost full and almost empty supply roll of film. The tension on the film speed to the drive roller from the supply cassette is accomplished by the following:

(a) The friction of the felt lips at the exit slit of the supply cassette casing (which is primarily used for a light seal).

(b) The friction or slip clutch mechanism sides of the supply cassette which prevents the film roll from spooling out. In particular a plastic cup rubbing against the inside wall of the supply cassette acts as a friction load.

2). The take-up side (a) Take-up cassette

The takeup cassette has a driven roller. The roller is driven at constant angular velocity. The value of angular velocity must be high enough at the start of take-up so that the film is pulled tautly around the take-up cassette spool because, if it isn't, it will back up and cause film jams. On the other hand, as more of the film is wound onto the take-up cassette spool, the surface speed of the film increases. In order to avoid this causing of excessive pull on the film which would exert excessive force on the drive roller (which in turn would disturb good registration), a 5 oz.-in. slip clutch limits this force as the roll gets larger while at the same time winding the film tautly at constant tension on the take-up spool.

(b) Exit Rollers

In order to isolate the engagement of and disengagement of the slip clutch in the take-up cassette from affecting the accuracy of the knurled drive roller and its grabbing of the film, friction rollers with a force of between 2 ½ and 4 pounds pressing on the film surface are employed. They are located between the drive roller and the take-up cassette and are driven slightly faster than the film so that they slip on the film surface.

FIG. 1 of the drawing is an overall schematic diagram of a laser scanner apparatus 20 (such as shown, for example, in U.S. Pat. No. 4,786,919, H. Bidner et al; Nov. 22, 1988) including laser scanner optics 22 and a film transport 24 provided in accordance with the invention. The laser scanner includes a casing 26 provided with a slot 28 through which exits a laser beam which traverses the film 30 being processed and deposits in cells thereon pixels which are closely registered in accordance with the invention as will be further discussed hereinbelow.

The film transport 24 includes a supply cassette or source 32 and a film takeup cassette or arrangement 34. Intermediate the source 32 and the takeup arrangement 34 is a knurled roller or roller pair 36. This roller or pair of rollers includes a surface arrangement of pins 38 which press into the film 30 thereby engaging the same for driving the same in the direction of arrow 40. Urging the film downwardly against the knurled roller or pair of rollers 36 is a idler roller 42. This idler roller 42 is spring-loaded against or towards the knurled roller or pair of rollers 36 by a spring (not shown) the force of which is indicated by arrow 44.

Roller 42 is preferably formed with a metal core (not shown) and is provided with a rubberized or butadiene surface. This rubberized surface preferably has a Shore A durometer of 85 plus or minus 5. The surface is preferably of a non-marking type which does not deform and which resumes its normal shape when not opposed directly against the knurled roller 36. The function of the roller 42 is as indicated above to force the film 30 against the pins 38 of knurled roller or segment 36 whereby the film can be engaged and driven in the direction of arrow 40.

Knurled roller 36 and pressure idler roller 42 are also seen in FIGS. 2 and 3 in somewhat enlarged scale. Therein is also seen the film 30. Although not illustrated the emulsion side of the film 30 is directed downwardly and is the side of the film which is engaged by the knurled knob 36. The film is for example in the order of magnitude of 4 mils. although this thickness can vary widely while being managed within the scope of the invention. It will be seen however that the film is engaged along a peripheral lateral edge thereof and preferably both peripheral lateral edges thereof at a distance E (see FIG. 3) in the order of magnitude of about 0.100–0.500 inches at each of the edges of the film. It will also be noted by reference to FIG. 1 that the points of contact of knurled roller 36 with film 30 are located at a distance S from the center of slot 28 through which the laser beam exits the casing 26, distance S being preferably in the order of magnitude of from about 1–3 inches. This normally leaves insufficient material between where the film is being photographically processed and where it is being transported by knurled roller or rollers 36 to affect the exceptional registration which the invention provides even though there may be some stretchability in the film material.

In a preferred embodiment of the invention, the knurled knob has an axial extent E(FIG. 3) of about 0.500 inches and a diameter in the order of magnitude of about 1.440 inches which is preferably held to about plus, or minus 0.001 inches. The knurls or pins 38 themselves are formed by grooves which are in the order of magnitude of about 0.005 to 0.030 inches. These grooves are arranged in two groups of parallel alignment each of which is at an angle B (FIG. 4) of about 30–60 degrees. The grooves of one group are in intersecting to provide the pins or knurls 38 (FIG. 3) which are developed between the grooves and which are generally of diamond-shaped cross section section. The pins 38 are thus of pyramidal shape. These grooves are preferably pitch in an order of magnitude of 40 per inch, the preferred range of this pitch lying within 15–75 per inch in order to achieve preferred results. The material from which the knurled rollers are formed is steel which is preferably given a zinc dyed black finish. The cuts are made in the raw material to provide sharp edges.

In association with the slot 28 in the casing 26 is a flat pressure plate 60. This pressure plate has a lower surface 62 which is flat and planar and which rests on the film 30 as it passes over the portion of the casing 26 which defines the slot 28. The function and weight of the pressure plate 60 is such as to flatten the film 30 over the slot 28 whereby to contribute to the exceptional registration provided in accordance with the invention.

Figure 6:
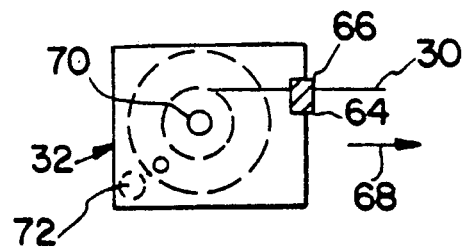
FIG. 6 is a side view, partially hidden, of the cassette of FIG. 5.

The supply cassette 32 illustrated in FIG. 1 of the drawing is shown further in FIGS. 5 and 6. Therein is seen the film 30 issuing from the cassette between lips 64 and 66. These lips are ordinarily intended to provide a light seal. However, these lips also engage the film 30 thereby to create a drag thereupon as the film moves in the direction of arrow 68 towards the associated knurled roller arrangement.

The film is supplied preferably on a roller 70 and thus is supplied in roll form. As has been discussed above the supply of film in roll form enables the process of the invention to be performed more rapidly.

Figure 7:
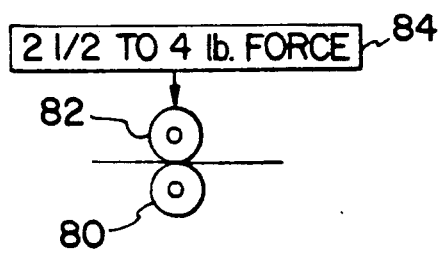
FIG. 7 is a diagrammatic side view of an arrangement of exit rollers employed in the apparatus of FIG. 1.
Figure 8:
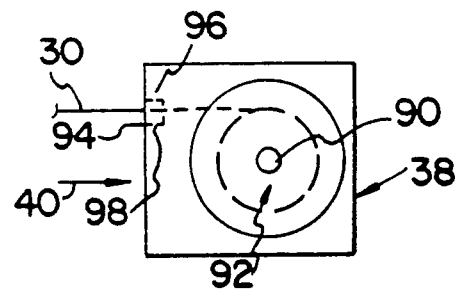
FIG. 8 is a side view of a takeup cassette employed in the apparatus of FIG. 1.

In further accordance with the invention and to further provide a drag preventing, uncontrolled spooling off of the film there is provided a drag or friction brake 72 of conventional type. This supply roll drag provides sufficient drag in the supply cassette to prevent the film roll from spooling out. The percent change in drag must be minimized between an almost full and an almost empty supply roll of film. The tension on the film feed to the slip clutch or slip brake mechanism inside of the supply cassette is intended to prevent a free spooling out of the film. In particular, a plastic cup P rubbing against the inside wall of the supply cassette can act as a friction member. A further feature of the invention mentioned hereinabove relative to FIG. 1 includes the exit rollers 80 and 82. These exit rollers also appear in FIG. 7. The lower roller 80 is a driven roller. The upper roller 82 is an idler or idling roller. The function of the exit rollers is to isolate the engagement of and disengagement of the slip clutch in the take-up cassette and prevent the same from affecting the accuracy of the knurled drive roller or rollers. These rollers are provided with a weight 84 bearing down o the roller 82 (and thus indirectly against roller 80) to apply force against and urge the same towards the film. FIG. 8 illustrates the take-up cassette 38 in some greater detail. Therein appears the roller 90 which takes up the film 30 arriving in the direction of arrow 40. Thus the film is collected in the form of a roll to be subsequently processed in greater detail. In FIG. 8 is illustrated the slip clutch 92 (such as, for example, appears in FIG. 3, page 209, *How Things Work*, by R. Segalat, Vol. III, Simon and Schuster). It will be noted that the film 30 enters the cassette 38; on the other hand, as the film is wound in increasing amounts onto the take-up roller 90, the surface speed of the film increases. In order to avoid this accumulation of film from causing excessive pull on the film which would exert an excessive force on the roller 36 the clutch 92 is provided in the form of a slip clutch which limits the force as the roll gets larger while at the same time winding the film tautly in the preferred embodiment of the invention.

Figure 9:
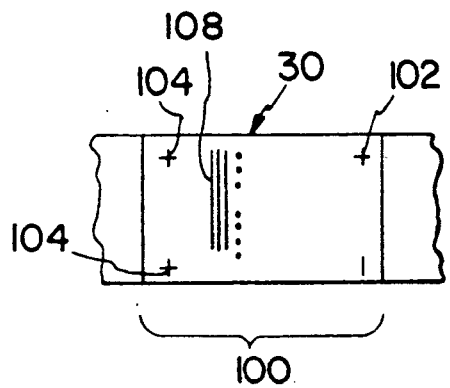
FIG. 9 is a top plan view of a photographic sheet provided with targets with respect to which registration is effected according to the improved method of the invention.

FIG. 9 illustrates a section of the film 30 and particularly a sheet 100 included therein. The registration is extremely important as each cell has to correspond with others on different sheets to provide for an appropriate mixture of colors. A digital control may be provided relative to the laser scanner 22 (FIG. 1) so that an appropriate half tone value will be provided for each cell or pixel. By matching up the targets a result within plus or minus 3 mils. can be achieved in accordance with the invention. In fact standards below plus or minus 2 mils. are readily achieved with values of 80 or 108 pica. Pressure bearing points resulting from the microsprocketing arrangement of the invention create a multitude of forces per unit area uniformly to avoid slippage in the main drive of the film being processed in accordance with the invention.

The driven rollers mentioned hereinabove include the knurled roller 36, the exit roller 80 and the take-up roller 90 of the take-up cassette 34. These may all be driven through a common gear train T (see FIG. 1) which is illustrated merely diagrammaticaly as there is no special feature in this gear train other than its being provided (see, for example, the gear trains illustrated in FIGS. 2 and 3, page 197, *How Things Work*, Vol. III, Simon and Schuster Inc.

From what has been stated hereinabove the method of the invention is a method of exposing film to a transversely scanning laser beam in accordance with one embodiment thereof to secure a plurality of exposures in close registration with one another. This method comprises driving the film past the laser beam at a constant speed by engaging the film with at least one knurled roller or the equivalent thereof driven at a constant angular velocity. The film is supplied from a supply roller and is in roll form and the film is taken up on a take-up roller preferably to form a roll. The knurled roller engages the film edgewise between the supply and take-up rollers.

The method of the invention further includes engaging the film with knurled rollers along opposite lateral edges of the film to an extent of about 0.100 to 0.350 inches at each of these edges. The film is forced against the knurled rollers with a resilient force that forces the knurls into the film. The method further comprises driving the film between the knurled roller and the take-up roller 80 by engaging the film with a driven exit roller the perpheral speed of which exceeds the speed of the film so that the driven roller slips on the film. The peripheral speed of the driven exit roller exceeds the speed of the film by about 2–20%.

Further, the method of the invention includes applying a drag to the film supplied by the supply roller to prevent a free spooling off of the film and driving the take-up roller through a slip clutch to compensate for the building up of the film on the takeup roller. The film is urged against the driven exit roller with a force of about 2 ½ –4 pounds.

There will now be obvious to those skilled in the art many modifications and variations of the apparatus and method set forth hereinabove. These modifications and variations will not depart from the scope of the invention if defined by the following claims.

What is claimed is:

1. Apparatus comprising a source of film, said film including a base and a laser sensitive material on said base, a film takeup means for collecting said film, laser means for scanning the film with a laser beam during movement of the film from said source to said takeup means, and at least one knurled roller for engaging said film and drawing the same from said source, opposed exit rollers on opposite sides of said film between the knurled roller and said takeup means, drive means to drive one of the exit rollers, and means to apply a weight against the other of the exit rollers to press said other exit roller towards said one exit roller; said source including a roller on which said film is wound, a casing within which the roller is mounted and which is provided with a slot for the exiting of said film, pressure lips adjacent the slot to create a drag on the film exiting from the casing, a roller in said source to support said film in the form of a roll, and a friction brake means to prevent uncontrolled spooling off of the film from the roll; a further roller within the takeup means to collect said film in the form of a roll, drive means to drive said further roller and slip clutch means coupling the latter said drive means to said further roller to take up the film without stretching or breaking the same to compensate for the accumulation of film.

2. Apparatus as claimed in claim 1 wherein said roller is positioned to engage the film along at least one lateral edge of the same.

3. Apparatus as claimed in claim 1 wherein said roller is one of a pair of knurled rollers positioned to engage the tape along spaced lateral edges of the same.

4. Apparatus as claimed in claim 1 comprising an idler roller including a resilient surface sandwiching the film against the knurled roller, and means to drive said knurled roller to transport said film past said laser means.

5. Apparatus as claimed in claim 2 comprising idler rollers including resilient surfaces sandwiching the lateral edges of the film against the knurled rollers.

6. Apparatus as claimed in claim 1 wherein the knurled roller has a knurl pitch in the order of magnitude of forty per inch.

7. Apparatus as claimed in claim 6 wherein the knurl pitch is defined by intersecting grooves forming angles arranged at 30–60 degrees to the axis defined by the roller, said grooves forming knurls of diamond shaped cross-section.

8. Apparatus as claimed in claim 1 wherein said laser means includes a casing provided with a slot through which said laser beam exits to traverse and process said film at a distance of no more than about one to three inches from where the film is engaged by the knurled roller.

9. Apparatus as claimed in claim 8 comprising a pressure plate having a flat surface resting on the film over the slot to flatten the film over the same.

10. Apparatus as claimed in claim 1 wherein the thusly driven exit roller is driven with a peripheral speed which is slightly faster than the available speed of the film and such that, the driven exit roller slips on the film.

11. Apparatus as claimed in claim 10 wherein the drive means for said further roller and for the driven exit roller includes a common gear train.

12. Apparatus as claimed in claim 7 wherein the knurled roller has an outer diameter in the order of magnitude of about 1.440 inches and is knurled over an axial extent in the order of magnitude of about 0.500 inches.

13. Apparatus as claimed in claim 7 wherein film is transported past the laser means emulsion side down and engaged by said knurls.

14. Apparatus as claimed in claim 1 wherein the slip clutch means includes an approximately five ounce-inch slip clutch.

15. Apparatus as claimed in claim 1 wherein the film is divisible into sheets each of which is provided with at least one target.

16. Apparatus as claimed in claim 1 wherein the film is of a mylar or polyester base and the film is of a thickness order of magnitude of about four mils.

17. Apparatus as claimed in claim 7 wherein the grooves have a common depth of about 0.025 to 0.028 inches and define knurls of pyramidal shape.

18. Apparatus as claimed in claim 1 comprising means to drive the knurled roller at a constant angular velocity.

19. A method of exposing a film to a transversely scanning laser beam to secure a plurality of exposures in close registration with one another, said method comprising driving the film past the laser beam at a constant speed by engaging the film with at least one knurled roller driven at a constant angular velocity, supplying the film from a supply roller and taking the film up on a takeup roller, the knurled roller engaging the film edgewise between the supply and takeup rollers, applying a drag to the film supplied by the supply roller to prevent a free spooling off of the film, and driving the takeup roller through a slip clutch to compensate for the building up of the film on the takeup roller.

20. A method as claimed in claim 19 comprising engaging the film with knurled rollers along opposite lateral edges of the film to an extent of about 0.100 to 0.350 inches at each of said edges.

21. A method as claimed in claim 19 comprising forcing the film against the knurled roller with a resilient force that forces the knurls into the film.

22. A method as claimed in claim 19 comprising further driving the film between the knurled roller and the takeup roller by engaging the film with a driven exit roller the peripheral speed of which exceeds the speed of the film so that the driven roller slips on the film.

23. A method as claimed in claim 22 wherein the peripheral speed of the driven exit roller exceeds the speed of the film by about two to twenty percent.

24. A method as claimed in claim 22 comprising urging the film against the driven exit roller with a force of about two and one-half to four pounds.

25. A method as claimed in claim 19 comprising knurling the knurled roller with two groups of intersecting parallel lines forming diamond-shaped pyramidal pins.

26. Apparatus as claimed in claim 19 wherein said weight is of a magnitude of about 2 ½ to 4 pounds.

27. Apparatus as claimed in claim 26 wherein said weight rests freely on said other exit roller.

* * * * *